(12) United States Patent
Senn

(10) Patent No.: US 11,755,704 B2
(45) Date of Patent: Sep. 12, 2023

(54) FACILITATING SECURE UNLOCKING OF A COMPUTING DEVICE

(71) Applicant: Fortinet, Inc., Sunnyvale, CA (US)

(72) Inventor: Marco Senn, Dietlikon (CH)

(73) Assignee: Fortinet, Inc., Sunnyvale, CA (US)

( * ) Notice: Subject to any disclaimer, the term of this patent is extended or adjusted under 35 U.S.C. 154(b) by 237 days.

(21) Appl. No.: 16/836,903

(22) Filed: Mar. 31, 2020

(65) Prior Publication Data

US 2021/0303667 A1    Sep. 30, 2021

(51) Int. Cl.
*G06F 21/31* (2013.01)
*G06F 21/32* (2013.01)

(52) U.S. Cl.
CPC ...... *G06F 21/32* (2013.01); *G06F 2221/2111* (2013.01)

(58) Field of Classification Search
CPC ... G06F 21/32; G06F 21/31; G06F 2221/2111
See application file for complete search history.

(56) References Cited

U.S. PATENT DOCUMENTS

| | | | | |
|---|---|---|---|---|
| 9,569,605 | B1* | 2/2017 | Schneider | H04L 9/3231 |
| 10,382,418 | B1* | 8/2019 | Bar-Menachem | H04L 63/08 |
| 10,795,984 | B1* | 10/2020 | Rafferty | G06F 21/32 |
| 2011/0314558 | A1* | 12/2011 | Song | G06F 21/316 |
| | | | | 726/28 |
| 2014/0289833 | A1* | 9/2014 | Briceno | H04L 9/006 |
| | | | | 726/5 |
| 2016/0055324 | A1* | 2/2016 | Agarwal | G06F 21/31 |
| | | | | 726/17 |
| 2016/0179554 | A1* | 6/2016 | Khosravi | H04L 63/102 |
| | | | | 726/1 |
| 2016/0188853 | A1* | 6/2016 | Smith | G06F 21/53 |
| | | | | 726/19 |
| 2019/0222424 | A1* | 7/2019 | Lindemann | H04L 9/3231 |

OTHER PUBLICATIONS

A Location-Based Mechanism for Mobile Device Security, by Jansen et al., published 2009. (Year: 2009).*
Location Based Authentication, by Sharma, published 2005 (Year: 2005).*
"Biometric authentication, the good, the bad, and the ugly", Onelogin, https://www.onelogin.com/learn/biometric-authentication, 2020, 6 pages.

(Continued)

*Primary Examiner* — Vu V Tran
(74) *Attorney, Agent, or Firm* — LAW OFFICE OF DORIAN CARTWRIGHT; Dorian Cartwright

(57) ABSTRACT

Systems and methods for facilitating secure unlocking of a computing device based on user-defined rules are provided. According to one embodiment, a request to unlock a client device is received by a security agent running on the client device. Responsive to the request, information regarding a set of operating characteristics of the client device is obtained by the security agent. One or more authentication mechanisms of multiple authentication mechanisms available on the client device are selectively enabled or disabled by the security agent based on the information regarding the set of operating characteristics and a set of user-defined rules.

17 Claims, 5 Drawing Sheets

(56) References Cited

OTHER PUBLICATIONS

"Biometrics: authentication & identification (definition, latest news)—2020 review", Thales Group, https://www.thalesgroup.com/em/markets/digital-identity-and-security/government/inspired/biometrics, last updated Jun. 24, 2020, 25 pages.

Zimmerman, Michael, "Biometrics and User Authentication", SANS Institute, Information Security Reading Room, 2002, 9 pages.

\* cited by examiner

FACILITATING SECURE UNLOCKING OF A COMPUTING DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to security of computing devices and biometric authentication. In particular, embodiments of the present invention relate to systems and methods for a configurable approach for allowing/disallowing the use of one or more user authentication mechanisms to unlock a computing device, for example, based on user-defined rules relating to one or more operating characteristics of the computing device.

Description of the Related Art

Users carry portable computing devices (e.g., smartphones, personal digital assistants, laptops, tablets, and the like) almost everywhere for a variety of purposes, such as making and receiving phone calls, sending and receiving text messages and emails, navigation, making payments, and accessing the Internet. These portable computing devices utilize various authentication mechanisms (e.g., biometric authentication, passwords, personal identification numbers (PINs), patterns, touch gestures) in an attempt to secure them against unauthorized access.

Modern authentication methods use biometric information associated with the user to free the user from having to remember a password, gesture or pattern to unlock their devices. For example, some portable computing devices can be unlocked blindly, even without looking at them, with only one hand (e.g., by fingerprint recognition) or with face or voice recognition. Such biometric-based authentication mechanisms save time and are also convenient and easy to use.

However, some biometric information can be obtained without a user's knowledge or permission. For example, a locked smartphone that is accessible with face recognition or fingerprint recognition can be unlocked by a third party placing a sleeping user's finger on the fingerprint reader or by scanning the sleeping, unconscious or dead user's face (potentially, augmented with a pair of taped-up glasses to bypass liveness detection) or in some cases by scanning a 3D-printed head. Alternatively, the biometric information may be provided by the user against their will, for example, in connection with a search, seizure or robbery in which the user is being compelled to unlock their portable computing device. Such unauthorized access of a user's portable computing device may reveal confidential and/or private information or enable access by third parties to protected applications, financial accounts and the like, which may result in irreparable harm to the user.

SUMMARY

Systems and methods are described for facilitating secure unlocking of a computing device based on user-defined rules. According to one embodiment, a request to unlock a client device is received by a security agent running on the client device. Responsive to the request, information regarding a set of operating characteristics of the client device is obtained by the security agent. One or more authentication mechanisms of multiple authentication mechanisms available on the client device are selectively enabled or disabled by the security agent based on the information regarding the set of operating characteristics and a set of user-defined rules.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
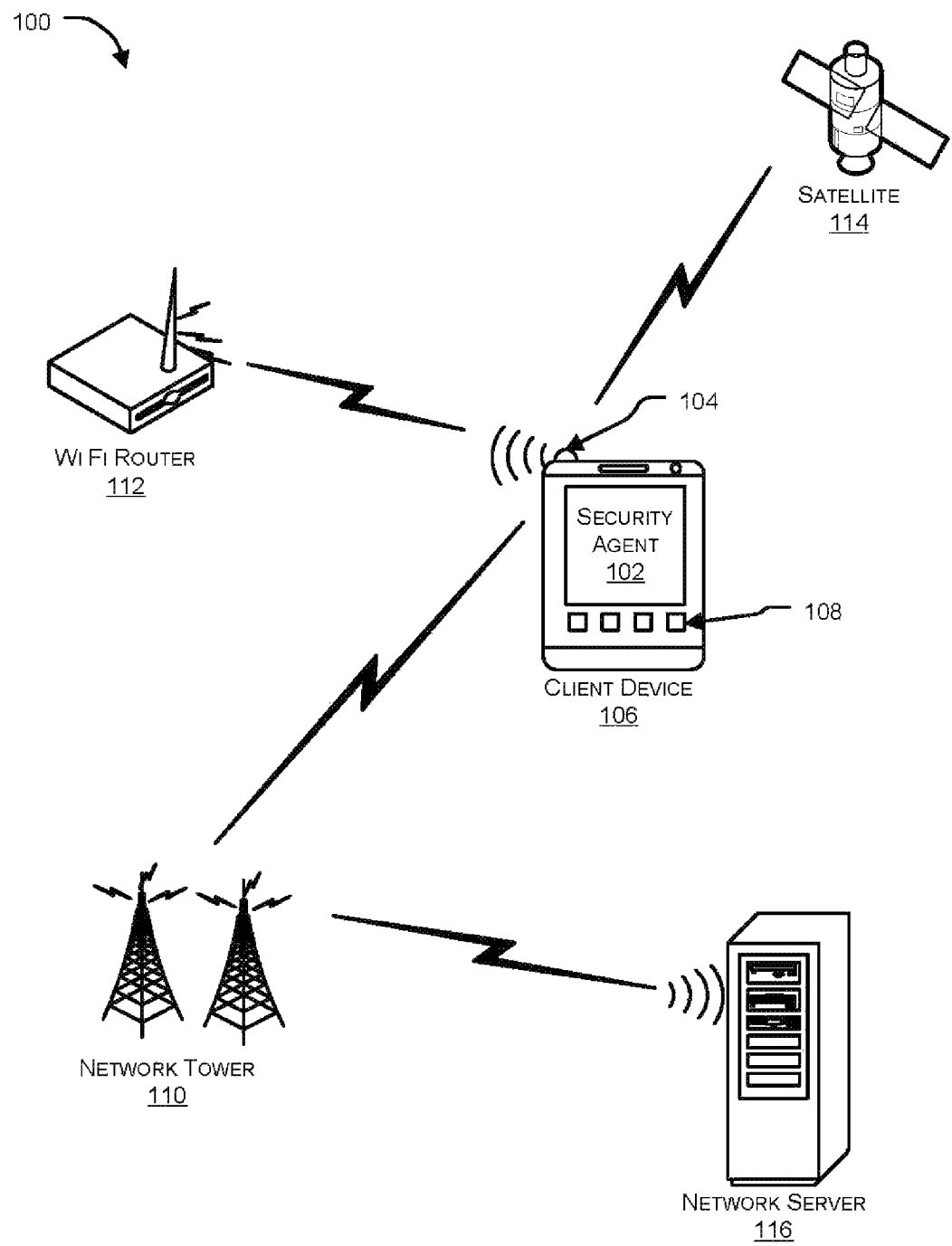
FIG. 1 illustrates a network architecture in which aspects of the present invention can be implemented in accordance with an embodiment of the present invention.

Systems and methods are described for facilitating secure unlocking of a computing device based on user-defined rules. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "endpoint protection platform" generally refers to cybersecurity monitoring and/or protection functionality implemented on an endpoint device. The endpoint protection platform may include a kernel-level Next Generation AntiVirus (NGAV) engine with machine learning features that prevent infection from known and unknown threats and may leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods are described for facilitating secure unlocking of a computing device based on user-defined rules. According to various embodiments of the present disclosure, a security agent running on the client device receives a request to unlock the client device from a user. In response to receipt of the request, the security agent determines one or more authentication criteria from various predefined authentication criteria, which control authentication of the user based on current operating characteristics of the client device. The security agent identifies authentication parameters using one or more sensors selected from various sensors of the client device based on the one or more enabled authentication criteria. The security agent then analyzes whether the authentication parameters match with reference to parameters associated with the client device such that in response to the authentication parameters matching the reference parameters the security agent authenticates the user to unlock the client device.

FIG. 1 illustrates a network architecture 100 in which aspects of the present invention can be implemented in accordance with an embodiment of the present invention. According to an embodiment, a security agent 102 can be implemented on a client device 108 to facilitate secure unlocking of client device 106 on access by a user. In one implementation, security agent 102 may be integrated with an operating system of client device 106 and may represent or be incorporated within a natively provided authentication system including one or more authentication mechanisms (e.g., password or biometric authentication). Alternatively, the security agent 102 may be a separate process (e.g., associated with an endpoint protection platform installed on client device 106) that intercepts user interface and/or operating system calls representing a request to unlock the client device 106. Client device 106 may include an electronic device having a processor, a non-transitory computer-readable memory, and a communication link 104 (e.g., a transceiver or communications port) that enables client device 106 to send and receive signals via one or more wireless communications networks. Non-limiting examples of client device 106 include smartphones, personal digital assistants, laptop computers, tablet computing devices, wearable computing devices, and media players. Client device 106 may include one or more sensors 108, including touch screen elements of a display and/or buttons, keys, switches, an image sensor, a camera, a biometric sensor, an audio sensor, an electronic switch, an electronic button, etc.

According to an embodiment, computing device 106 may send and receive data via one or more communications networks. For example, one or more transmission towers 110 may relay data and/or voice signals to client device 106 and a Wi-Fi network or similar hotspot may send and receive signals from a Wi-Fi router 112 or similar device. A satellite 114 may send or receive signals such as global positioning system (GPS) location data to and from client device 106. Additionally or alternatively, a network server 116 may be in communication with one or more networks so to facilitate sending and/or receiving of information to and/or from client device 106.

According to one embodiment, client device 106 may be operable to automatically enter a secured, or locked, state when not in use for a specific amount of time, responsive receipt of a lock command from the end user, responsive to being holstered or the like. The user may be required to perform an authentication process in order to transition client device 106 from the secured state to an unlocked state to access various functions of client device 106.

In the context of various examples described herein, security agent 102 receives a request to unlock client device 106 and then determines which of one or more authentication mechanisms (e.g., face recognition, fingerprint recognition, etc.) are permitted to authenticate the user, based on the current operating characteristics of the client device 106 and a set of user-defined rules. According to one embodiment, the security agent 102 may intercept the request, for example, by hooking the user interface call or the operating system call (e.g., representing an event associated with a "home "button, a power button, or a touch screen) and may allow the call to complete after selectively enabling and/or disabling one or more of those of the authentication mechanisms available on the client device 106. In another embodiment, the security agent 102 may be incorporated within a native authentication system of the operating system of the client device 106 that implements one or more authentication mechanisms supported by the operating system of the client device 106.

Non-limiting examples of operating characteristics of the client device 106 that may be considered include location information regarding the client device 106, a network name of a mobile network associated with the client device 106, a duration of time for which client device 106 was locked, and a time at which the request was initiated. As those skilled in the art will appreciate the location of the client device 106 may be determined by a variety of mechanisms including, but not limited to, use of a GPS sensor, use of Internet Protocol (IP) address assigned to the client device 106 (e.g., by obtaining a geolocation of the IP address), and use of a service set identifier (SSID) of a wireless network to which the client device 106 is connected.

In this manner, one or more biometric authentication mechanisms available on the client device 106 and used for unlocking the client device 106 may be selectively enabled/disabled based on the status of one or more of the operating characteristics of the client device 106 in accordance with a set of user-defined rules, thus facilitating secure unlocking of the client device 106. For example, for security purposes, a user of the client device 106 may establish one or more rules that disable use of a fingerprint reader of the client device 106 to unlock the client device 106 during travel outside of the United States, disable use of the fingerprint reader other than within a city in which the user resides and/or disable the use of face recognition during hours the user expects to be sleeping. Such rules may be configured via a graphical user interface associated with the security agent 102 or via a settings screen associated with the operating system of the client device 106.

Depending upon the particular implementation, the security agent 102 may itself perform authentication processing or may represent an intermediate process that intercepts events that would otherwise have been directed to a native authentication mechanism available on the client device 106. According to one embodiment, the security agent 102 may collect authentication parameters via one of various sensors 108 of client device 106 based on those of the enabled authentication mechanisms, if any. The authentication parameters may include, but are not limited to biometric information, facial recognition information, an alpha-numeric password, a touch pattern, a voice recognition pattern and a gesture.

To the extent the authentication is performed by the security agent 102, the security agent 102 then evaluates whether the authentication parameters match reference parameters associated with client device 106. The reference parameters may be stored in client device 106 such that security agent 102 calculates a similarity score based on similarity of the identified authentication parameters with the stored reference parameters. When the user is successfully authenticated (e.g., the similarity score meets or exceeds a threshold), the security agent 102 may allow the unlock request to proceed and the client device 106 will be unlocked.

Alternatively, when the security agent 102 represents an intermediate process, after intercepting the unlock request and selectively enabling/disabling the available authentication mechanisms based on the current operating characteristics and the user-defined rules, the security agent 102 may allow the intercepted unlock request to proceed along its normal processing path, for example, to cause a particular authentication mechanism to be invoked. As those skilled in the art will appreciate, only those of the available authentication mechanisms that are enabled will be capable of being invoked successfully.

Figure 2:
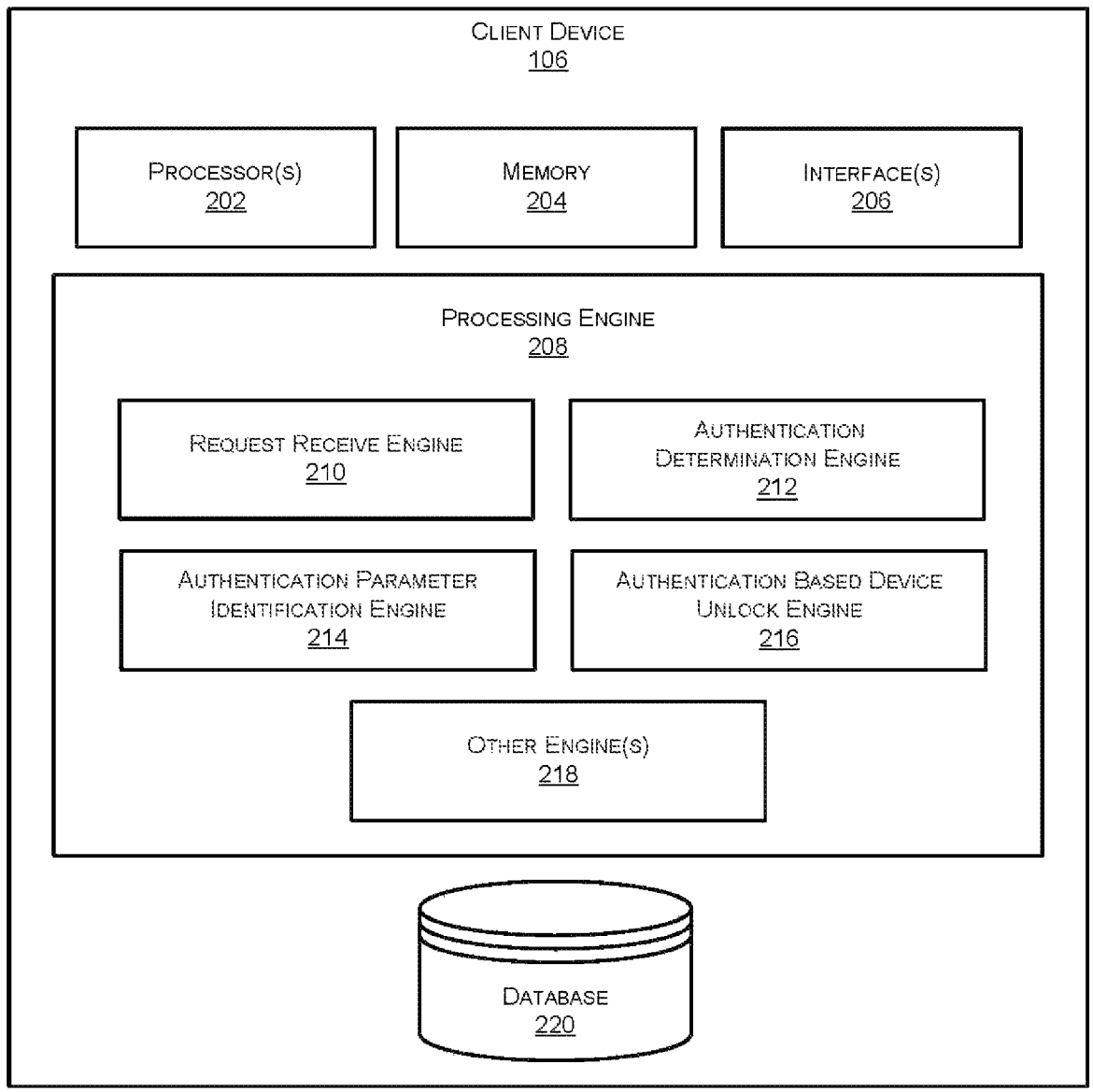
FIG. 2 is a block diagram illustrating functional components of a client device in accordance with an embodiment of the present invention.

FIG. 2 is a block diagram illustrating functional components of a client device 106 in accordance with an embodiment of the present invention. In the context of the present example, client device 106 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the client device 106. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Client device 106 can also include one or more Interface(s) 206. Interface(s) 206 may include a variety of interfaces, for example, interfaces for data input and output devices, referred to as I/O devices, storage devices, and the like. Interface(s) 206 may facilitate communication of client device 106 with various devices coupled to client device 106. Interface(s) 206 may also provide a communication pathway for one or more components of client device 106. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, client device 106 can include the machine-readable storage medium storing the instructions and the processing resource to execute the instructions, or the machine-readable storage medium may be separate but accessible to client device 106 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a request receive engine 210, an authentication determination engine 212, an authentication parameter identification engine 214, authentication-based device unlock engine 216 and other engine(s) 218. Other engine(s) 218 can implement functionalities that supplement applications or functions performed by client device 106 or processing engine(s) 208.

According to an embodiment, request receive engine 210 receives or intercepts a request to unlock client device 106 from the operating system or from the user interface of client device 106. Responsive to the request, authentication determination engine 212 determines one or more authentication mechanisms from among all available authentication mechanisms available on the client device 106 that are to be enabled and/or disabled for purposes of authenticating the user based on the current operating characteristics of client device 106. In one implementation, the current operating characteristics include any or a combination of location information of client device 106, a network name of a mobile network associated with client device 106, a duration of time for which client device 106 was locked, and time and/or date associated with the unlock request.

Authentication parameter identification engine 214 is responsible for identifying authentication parameters using one or more sensors selected from various sensors of client device 106 that are selected based on the one or more enabled authentication mechanisms. The authentication parameter identification engine 214 may represent functionality associated with a native authentication mechanism available on the client device 106 or may be functionality implemented within a security agent of the operating system of the client device 106 or a security agent associated with an endpoint protection platform running on the client device 106. Non-limiting examples of sensors include, an image sensor, a camera, a biometric sensor, an audio sensor, an electronic switch, an electronic button and one or more touch screen elements and non-limiting examples of authentication parameters that may be collected via such sensors include, any or a combination of biometric information, facial recognition information, an alpha-numeric password, a touch pattern, a voice recognition pattern and a gesture.

Authentication-based device unlock engine 216 is responsible for evaluating the collected authentication parameters against reference parameters (e.g., stored in memory 204 of client device 106). As above, the authentication-based device unlock engine 216 may represent functionality associated with an existing authentication mechanism available on the client device 106 or may be functionality implemented within a security agent of the operating system of the client device 106 or a security agent associated with an endpoint protection platform running on the client device 106. According to one embodiment, authentication-based device unlock engine 216 calculates a similarity score based on similarity of the collected authentication parameters and the stored reference parameters and the authentication parameters are considered to match the reference parameters when the similarity score exceeds a pre-defined or configurable threshold value. When the user is successfully authenticated (e.g., as a result of the collected authentication parameters matching the stored reference parameters), the authentication based device unlock engine 216, unlocks client device 106.

Figure 3:
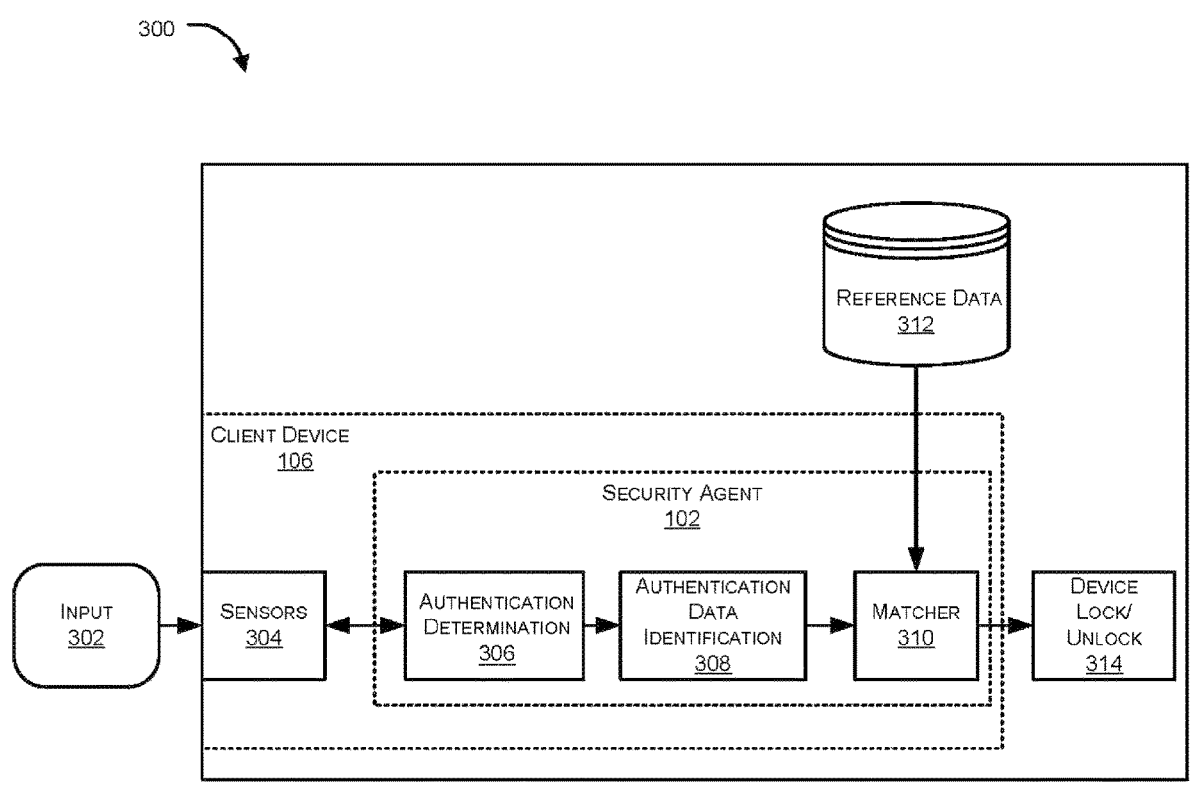
FIG. 3 is a block diagram illustrating implementation of a security agent for unlocking a client device in accordance with an embodiment of the present invention.

FIG. 3 is a block diagram 300 illustrating implementation of a security agent 102 for unlocking a client device 106 in accordance with an embodiment of the present invention. In the context of the present example, any sensor selected from sensors 304 can receive an input 302 indicating a request to unlock client device 106. At block 306, security agent 102 determines authentication mechanisms that are enabled for authentication of the user based on current operating characteristics of client device 106. Further, at block 308, security agent 102 identifies or collects authentication parameters via a sensor of the various sensors 304 of client device 106. As those skilled in the art will appreciate, the sensor through which the authentication parameters are received/collected is based on the particular authentication mechanism that is activated/invoked responsive to the unlock request. A matcher 310 then evaluates whether the authentication parameters match reference parameters of client device 310. The reference parameters can be obtained from reference data 312 stored either in the cloud or on client device 312 itself or combination thereof. In one embodiment, matcher 310 calculates a similarity score based on a similarity of the identified authentication parameters with the stored reference parameters. Based on the similarity score, matcher 310 may lock/unlock device at block 314. For example, when the similarity score exceeds a pre-defined or configurable threshold value, the user has been authenticated and matcher 310 unlocks client device 106.

Figure 4:
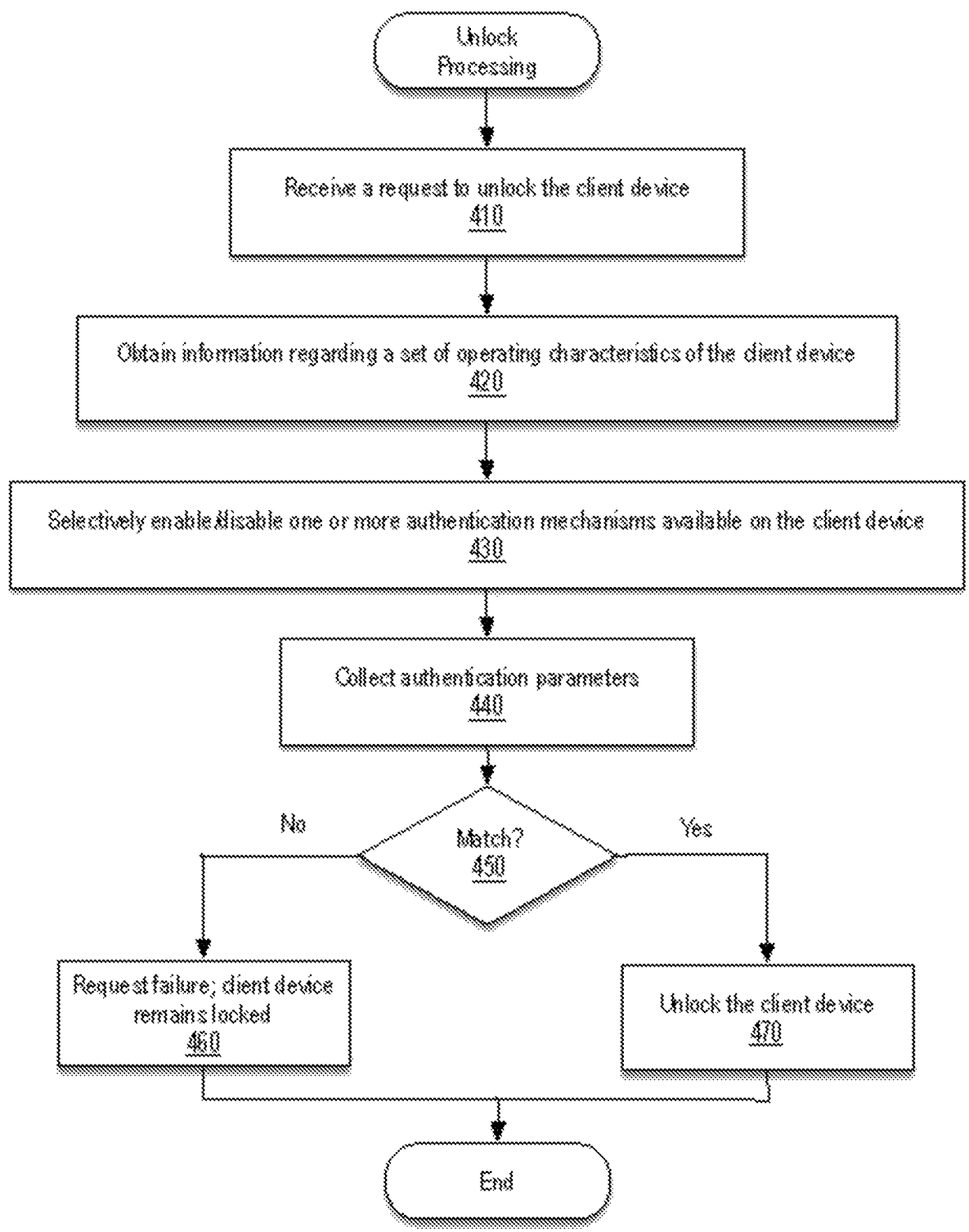
FIG. 4 is a flow diagram illustrating a process performed by a security agent for unlocking a client device in accordance with an embodiment of the present invention.

FIG. 4 is a flow diagram 400 illustrating a process performed by a security agent for unlocking a client device in accordance with an embodiment of the present invention.

The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 500 described with reference to FIG. 5 below.

In the context of the present example, at block 410, a request is received to unlock the client device. According to one embodiment, the request is received or intercepted by a security agent (e.g., security agent 102).

At block 420, information regarding a set of operating characteristics of the client device is obtained. According to one embodiment, the security agent retrieves information regarding any or a combination of location information of the client device, a network name of a mobile network associated with client device, a duration of time for which client device has been locked, and a time and/or date associated with the unlock request. The location of the client device can be determined based on a GPS sensor of the client device, by performing a geolocation lookup based on the IP address of the client device, based on an SSID of a wireless network to which the client device is connected, or based on a network name of a mobile network to which the client device is connected.

At block 430, one or more authentication mechanisms available on the client device are selectively enabled and/or disabled. Examples of potential user authentication mechanisms that may be supported by the client device include biometric authentication (e.g., fingerprint recognition, face recognition), password, PIN, and/or pattern entry, and touch gestures.

In one embodiment, a set of user-defined rules previously established by the user of the client device is evaluated based on the set of operating characteristics. The set of user-defined rules may be in the form of conditional expressions involving one or more of the operating characteristics of the set of operating characteristics and one or more actions (e.g., enable and/or disable) for one or more of the authentication mechanisms. For example, the user of the client device may have previously established a first rule that enables use of password authentication at all times. The user of the client device may have also established a second rule that disables use of a fingerprint reader of the client device to unlock the client device when the location of the client device is anywhere outside of the United States and enables use of the fingerprint reader when the location of the client device is within the United States. Additionally, the user may have established a third rule that disables the use of face recognition during hours the user expects to be sleeping (e.g., between 11:00 PM and 6:00 AM) and enables the use of face recognition for all other times. Those skilled in the art will appreciate these rules are merely presented for sake of illustration and more or fewer rules or a completely different set of rules may be configured.

At block 440, the user is assumed to make use of one of the enabled authentication mechanisms to authenticate him/herself and authentication parameters are collected by the authentication mechanism. For example, if the user is attempting to unlock his/her smartphone by using an integrated fingerprint reader, then one or more fingerprints area collected from the fingerprint reader.

At decision block 450, a determination is made regarding whether the collected authentication parameters match previously established reference parameters. When the collected authentication parameters (e.g., one or more fingerprints) match, the user has been successfully authenticated and processing proceeds with block 470; otherwise, the user has not been successfully authenticated and processing branches to block 460.

At block 460, the unlock request fails and the client device remains locked. In the context of the present example, unlock processing is now complete. Those skilled in the art will appreciate at block 460 an error message or some other indication may be provided to the user regarding the authentication failure and the user may be provided with another opportunity to provide authentication parameters by looping back to block 440. In such a scenario, a limited number of retries may be permitted before the client device is locked for an extended amount of time or permanently locked.

At block 470, responsive to successful user authentication, the client device may be unlocked.

Figure 5:
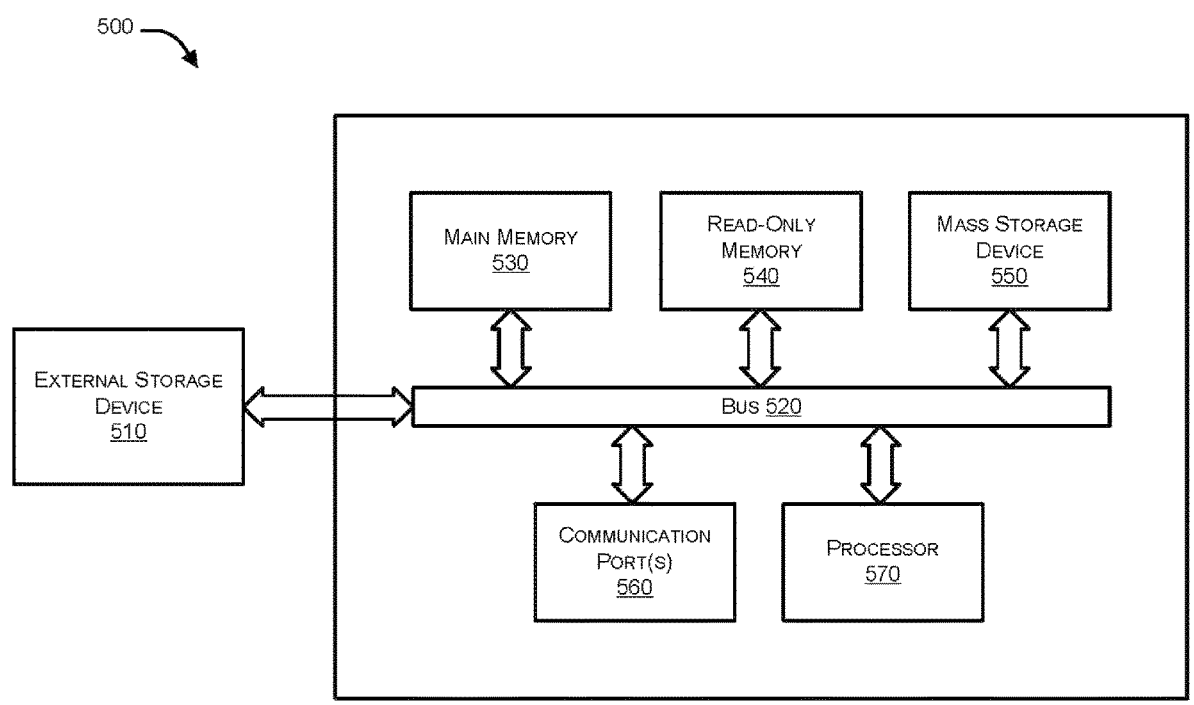
FIG. 5 illustrates an exemplary computer system in which or with which embodiments of the present invention may be utilized.

FIG. 5 illustrates an exemplary computer system 500 in which or with which embodiments of the present invention may be utilized. As shown in FIG. 5, computer system includes an external storage device 510, a bus 520, a main memory 530, a read only memory 540, a mass storage device 550, a communication port 560, and a processor 570. In one embodiment, computer system 500 may represent some portion of a client device (e.g., client device 106 of FIG. 1).

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by a security agent running on a client device, a request to unlock the client device from a user; and
responsive to the request:
obtaining, by the security agent, information regarding a set of operating characteristics of the client device; and selectively enabling or disabling, by the security agent, one or more authentication mechanisms of a plurality of authentication mechanisms available on the client device based on the information regarding the set of operating characteristics and a set of user-defined rules concerning at least time, location and a Service Set Identifier (SSID) of a wireless network associated with the client device, including disabling a facial recognition authentication mechanism during hours a user expects to be sleeping;
collecting, by an enabled authentication mechanism of the plurality of authentication mechanisms, authentication parameters from the user via one or more sensors of the client device; and when the authentication parameters match reference parameters associated with the client device, causing, by the enabled authentication mechanism, the client device to be unlocked.

2. The method of claim 1, wherein the security agent is integrated within an operating system of the client device.

3. The method of claim 1, wherein the security agent is integrated within an endpoint protection platform installed on the client device.

4. The method of claim 1, wherein the set of operating characteristics include any or a combination of location information associated with the client device, a duration of time for which the client device was locked, and time at which the request was initiated.

5. The method of claim 1, wherein the location information is based on a geolocation of an Internet Protocol (IP) address of the client device, a Service Set Identifier (SSID) of a wireless network associated with the client device, or a network name of a mobile network associated with the client device.

6. The method of claim 1, wherein the authentication parameters comprise any or a combination of biometric information, facial recognition information, an alpha-numeric password, a touch pattern, a voice recognition pattern and a gesture.

7. The method of claim 1, wherein the plurality of sensors include any or a combination of an image sensor, a camera, a biometric sensor, an audio sensor, an electronic switch, an electronic button and one or more touch screen elements.

8. A non-transitory computer-readable storage medium embodying a set of instructions representing a security agent, which when executed by a processing resource of a client device, causes the processing resource to perform a method comprising:

receiving, by the security agent, a request to unlock the client device from a user; and responsive to the request:

obtaining, by the security agent, information regarding a set of operating characteristics of the client device; and selectively enabling or disabling, by the security agent, one or more authentication mechanisms of a plurality of authentication mechanisms available on the client device based on the information regarding the set of operating characteristics and a set of user-defined rules concerning at least time, location and a Service Set Identifier (SSID) of a wireless network associated with the client device, including disabling a facial recognition authentication mechanism during hours a user expects to be sleeping;

collecting, by an enabled authentication mechanism of the plurality of authentication mechanisms, authentication parameters from the user via one or more sensors of the client device; and when the authentication parameters match reference parameters associated with the client device, causing, by the enabled authentication mechanism, the client device to be unlocked.

9. The non-transitory computer-readable storage medium of claim 8, wherein the security agent is integrated within an operating system of the client device.

10. The non-transitory computer-readable storage medium of claim 8, wherein the security agent is integrated within an endpoint protection platform installed on the client device.

11. The non-transitory computer-readable storage medium of claim 8, wherein the set of operating characteristics include any or a combination of location information associated with the client device, a duration of time for which the client device was locked, and time at which the request was initiated.

12. The non-transitory computer-readable storage medium of claim 8, wherein the location information is based on a geolocation of an Internet Protocol (IP) address of the client device, a Service Set Identifier (SSID) of a wireless network associated with the client device, or a network name of a mobile network associated with the client device.

13. The non-transitory computer-readable storage medium of claim 8, wherein the authentication parameters comprise any or a combination of biometric information, facial recognition information, an alpha-numeric password, a touch pattern, a voice recognition pattern and a gesture.

14. The non-transitory computer-readable storage medium of claim 8, wherein the plurality of sensors include any or a combination of an image sensor, a camera, a biometric sensor, an audio sensor, an electronic switch, an electronic button and one or more touch screen elements.

15. A client device comprising:

a processing resource; and a non-transitory computer-readable medium, coupled to the processing resource, having stored therein instructions representing a security agent that when executed by the processing resource cause the processing resource to perform a method comprising:

receiving, by the security agent, a request to unlock the client device from a user; and responsive to the request:

obtaining, by the security agent, information regarding a set of operating characteristics of the client device; and selectively enabling or disabling, by the security agent, one or more authentication mechanisms of a plurality of authentication mechanisms available on the client device based on the information regarding the set of operating characteristics and a set of user-defined rules concerning at least time, location and a Service Set Identifier (SSID) of a wireless network associated with the client device, including disabling a facial recognition authentication mechanism during hours a user expects to be sleeping;

collecting, by an enabled authentication mechanism of the plurality of authentication mechanisms, authentication parameters from the user via one or more sensors of the client device; and when the authentication parameters match reference parameters associated with the client device, causing, by the enabled authentication mechanism, the client device to be unlocked.

16. The client device claim 15, wherein the computer system comprises a smartphone.

17. The client device of claim 15, wherein the set of operating characteristics include any or a combination of location information associated with the computer system, a duration of time for which the computer system was locked, and time at which the request was initiated.

* * * * *